US007207671B2

(12) United States Patent
Morris et al.

(10) Patent No.: US 7,207,671 B2
(45) Date of Patent: Apr. 24, 2007

(54) HEPA FILTER PRINTHEAD PROTECTION

(75) Inventors: Brian G. Morris, Dayton, OH (US); Donald Clarke Grant, Excelsior, MN (US); Thomas Alan Gajus, West Chester, OH (US)

(73) Assignee: Eastman Kodak Company, Rochester, NY (US)

( * ) Notice: Subject to any disclaimer, the term of this patent is extended or adjusted under 35 U.S.C. 154(b) by 388 days.

(21) Appl. No.: 10/839,406

(22) Filed: May 5, 2004

(65) Prior Publication Data

US 2005/0248646 A1 Nov. 10, 2005

(51) Int. Cl.

| | |
|---|---|
| ***B41J 29/13*** | (2006.01) |
| ***B41J 2/175*** | (2006.01) |
| ***B01D 50/00*** | (2006.01) |
| ***B01D 59/50*** | (2006.01) |

(52) U.S. Cl. ........................ 347/108; 347/93; 55/385.1

(58) Field of Classification Search ................ 347/108, 347/93, 84, 85, 222, 34; 55/385.2, 385.1; 346/145

See application file for complete search history.

(56) References Cited

U.S. PATENT DOCUMENTS 4,370,155 A * 1/1983 Armbruster .................. 96/140
4,454,621 A 6/1984 Testone
4,591,869 A 5/1986 Katerberg
4,769,958 A * 9/1988 Limp ............................ 52/39
4,875,054 A 10/1989 Archer
4,922,267 A 5/1990 Ozawa et al.
4,961,766 A * 10/1990 Hogan ....................... 55/385.2
5,064,456 A * 11/1991 Gantzer ..................... 55/385.1
5,096,474 A * 3/1992 Miller et al. .................. 96/403
5,167,681 A * 12/1992 O'Keefe et al. ........... 55/385.2
5,240,478 A * 8/1993 Messina ...................... 95/273
5,519,420 A 5/1996 Zorn
5,596,783 A 1/1997 Testone
5,743,927 A * 4/1998 Osendorf ..................... 55/497
6,003,988 A 12/1999 McCann et al.
6,050,191 A 4/2000 Enderle et al.
6,117,202 A * 9/2000 Wetzel ....................... 55/385.2
6,238,044 B1 * 5/2001 Silverbrook et al. .......... 347/86
6,309,437 B1 * 10/2001 Jones ........................ 55/385.1
6,383,242 B1 * 5/2002 Rogers et al. ............. 55/385.2

(Continued)

FOREIGN PATENT DOCUMENTS

| | | |
|---|---|---|
| CA | 2 285 885 | 4/2001 |
| EP | 0 571 785 | 12/1993 |
| JP | 08238784 A * | 9/1996 |

*Primary Examiner*—Manish Shah
*Assistant Examiner*—Leonard Liang

(57) ABSTRACT

An air flow restriction device relates to an ink jet printhead enclosure with body, a load supportable moveable lid with an opening disposed on the body, and a chamber within the body. Continuous web media is disposed in the chamber with at least one ink jet printhead located above the continuous web media within the chamber. A high efficiency air filter with a fan is located within the opening of the moveable lid and the filter with fan flows continuous clean filtered air into the enclosure, bathing the ink jet printhead and the continuous web media in clean filtered air. An air flow restriction device is placed in the side of the chamber below the continuous web media creating positive pressure in the chamber when the fan and filter floods the chamber with the clean filtered air, thereby reducing particle contamination in the chamber by a factor of at least ten.

23 Claims, 2 Drawing Sheets

U.S. PATENT DOCUMENTS

| | | | | |
|---|---|---|---|---|
| 6,482,083 | B1 * | 11/2002 | Nilsson | 454/187 |
| 6,623,538 | B2 * | 9/2003 | Thakur et al. | 55/385.2 |
| 6,714,229 | B2 * | 3/2004 | Miyazaki et al. | 347/223 |
| 2001/0012048 | A1 | 8/2001 | Kinjyou et al. | |
| 2002/0129709 | A1 * | 9/2002 | Kunstadt et al. | 96/4 |
| 2002/0180828 | A1 * | 12/2002 | Webster et al. | 347/34 |
| 2003/0056646 | A1 * | 3/2003 | Tanaka et al. | 95/8 |
| 2003/0079449 | A1 * | 5/2003 | Jones | 55/385.6 |
| 2003/0209140 | A1 * | 11/2003 | Kutt et al. | 95/8 |
| 2005/0066633 | A1 * | 3/2005 | Jang et al. | 55/385.2 |

* cited by examiner

HEPA FILTER PRINTHEAD PROTECTION

CROSS REFERENCES TO RELATED APPLICATIONS

Field of the Inair Flow Restriction Deviceion

The present embodiments relate to enclosures for holding ink jet printheads that provide clean filtered air to those printheads and accompanying web media.

BACKGROUND OF THE INAIR FLOW RESTRICTION DEVICEION

Current ink jet printing systems have problems with particle contamination caused by particles in the air around the printheads. A need has existed to significantly reduce particle concentrations in and around a printhead by providing clean filtered air to the printhead and surroundings.

Zorn U.S. Pat. No. 5,519,420 teaches a vacuum means to clean paper dust off the surface of the paper before the paper travels to the ink jet printhead. The printhead is further shielded from contamination by air current means. The air current means provide a curtain of air between the ink jet printer and the document. However, this air is not cleaned to the extent of a HEPA filter.

Archer U.S. Pat. No. 4,875,054 teaches a hood for placement over the printhead, wherein filtered air can be pumped into the hood so that the air flows past the printhead. A hood is not a closed container for the web media and Archer secures directly to the printhead.

Katerberg U.S. Pat. No. 4,591,869 teaches that the upper region of the printhead includes an air plenum. In the Katerberg reference, air enters the plenum region through filter means. Droplet streams provide the motive force for drawing air through the filter means. Fan means are not taught and print media enclosures are not suggested.

The prior art listed herein is hereby incorporated by reference.

A need exists for a device that provides clean filtered air to a printhead and the surrounding area that is better than known devices.

The present embodiments described herein were designed to meet these needs.

SUMMARY OF THE INAIR FLOW RESTRICTION DEVICEION

An ink jet printhead enclosure includes a body, a load supportable moveable lid with an opening disposed on the body, and a chamber within the body. Continuous web media is disposed in the chamber with one or more ink jet printheads located above the continuous web media within the chamber. A high efficiency air filter with a fan is located within the opening of the moveable lid, and a filter with a fan sends continuous clean filtered air into the enclosure, thereby bathing the ink jet printhead and the continuous web media in clean filtered air. An air flow restriction device is placed on the side of the chamber below the continuous web media creating positive pressure in the chamber when the fan and filter floods the chamber with the clean filtered air, thereby reducing particle contamination in the chamber by a factor of at least ten.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

High efficiency particulate air filters are the type commonly used to filter the air in "clean" rooms. The present devices relate to enclosures for ink jet printheads, wherein the continuous web media makes one or more passes through a printer cabinet.

By installing a high efficiency air filter, such as a High Efficiency Particulate Air (HEPA) filter or an Ultra Low Penetration Air (ULPA) filter, on an ink jet printing system in combination with an air flow restriction device, the particle count in the chamber is dramatically reduced by at least ten fold. Typically, the partial count drops to a particle contamination of less than 1000 particles per cubic foot for particles with an average diameter greater than or equal to 0.5 microns.

The improved ink jet printhead enclosure is designed to provide improved ink jet printhead reliability by reducing the incidents of operator intervention due to printhead damage from particle contamination, and thereby, increasing the average printhead life. In addition, the improved ink jet enclosure reduces the chances of catastrophic failure and the need to replace the printheads in the enclosure. In a recent test, the particle count of an improved enclosure was reduced from 330,000 particles per cubic foot to 480 particles per cubic foot, which is a dramatic improvement in saving money and time for the users of printheads.

In general, the devices relate to ink jet printhead enclosures with a body, a load supportable moveable lid with an opening disposed on the body, and a chamber within the body. Continuous web media is disposed in the chamber with at least one ink jet printhead located above the continuous web media within the chamber. A high efficiency air filter with a fan is located within the opening of the moveable lid, and the filter with fan flows continuous clean filtered air into the enclosure. The filter with fan bathes the ink jet printhead and the continuous web media in clean filtered air. More than one ink jet printhead can be used in this enclosure The printhead is usable in an inkjet print station, such as a Kodak Versamark DT92 print station available from Kodak Versamark of Dayton, Ohio.

An air flow restriction device is placed in the side of the chamber below the continuous web media creating positive pressure in the chamber when the fan and filter floods the chamber with the clean filtered air, thereby reducing particle contamination in the chamber by a factor of at least ten.

Figure 1:
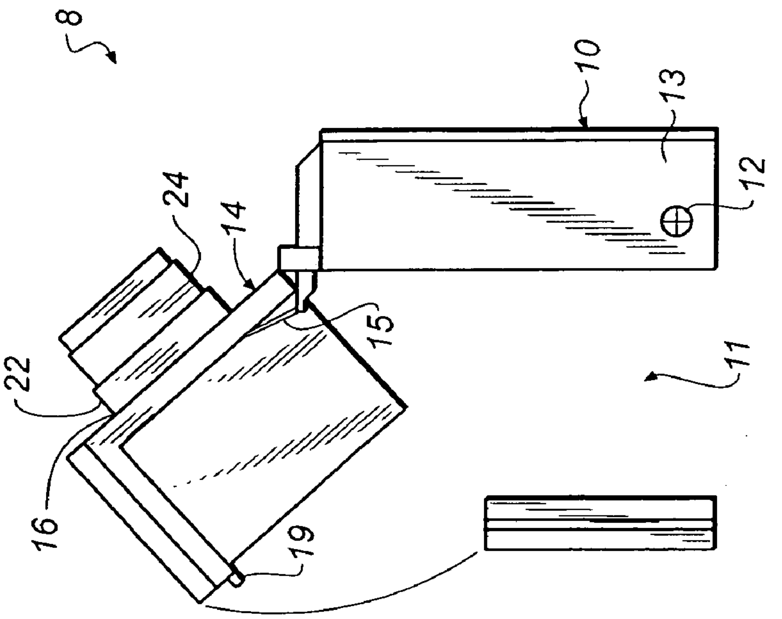
FIG. 1 depicts a side view of an embodiment of the enclosure with the moveable lid.

Referring now to the figures, FIG. 1 depicts a side view of an enclosure with the load supportable moveable lid 14. The enclosure 8 has a body 10 forming a chamber 11 below the load supportable moveable lid 14, with at least one air flow restriction device 12 that is preferably located in a lower portion of the chamber and in a side 13 of the chamber.

The load supportable moveable lid 14 is either hinged to the body 10, slidable engaging the body 10, such as on rails, or rotatable above the body 10 so the lid 14 can be elevated over the body 10 sufficient to remove an ink jet printhead from the chamber. Moveable rotatable pins or pivoting connectors can be used to hold the moveable lid in a pivotable engagement with the body.

An optional supporting arm 15, such as a hydraulic or pneumatic arm, can maintain the lid in the up position.

Continuing with FIG. 1, the high efficiency air filter 22 can be located in the opening 16 of the movable lid 14 above the chamber 11. The filter 22 can be connected to a fan 24 to blow the clean filtered air into the chamber 11 creating a positive air pressure. The filter 22 and fan 24 bathe the ink jet printhead with the clean filtered air 28. A gasket 19 can be placed on the body 10 between the lid 14 and the body 10 to seal the body 10 when the lid 14 is closed against the body 10. The gasket 19 can be an elastometric material.

The enclosure can be modular, which means one enclosure can be connected to another enclosure with a shared wall.

Figure 2:
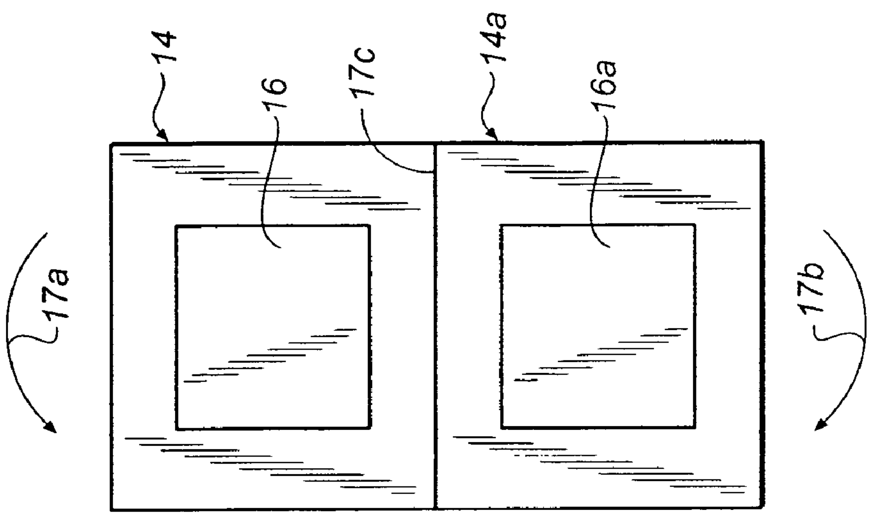
FIG. 2 depicts a top view of two connected lids, showing a modular embodiment of the enclosure.

FIG. 2 depicts the modular version, wherein the shared wall is depicted by a line 17*c*. In this top view, two lids 14 and 14*a* for two enclosures are connected together as a modular unit. Arrows 17*a* and 17*b* in FIG. 2 indicate the direction in which the lids 14 and 14*a* would pivot when opened.

For this modular construction, each lid 14 and 14*a* has an opening 16 and 16*a*. A HEPA filter is placed into each opening 16 and 16*a*. A fan 24 is located on top of the filter 22, as shown in FIG. 1. Each filter 22 is connected to a power supply (not shown) to operate the fan 24.

Figure 3:
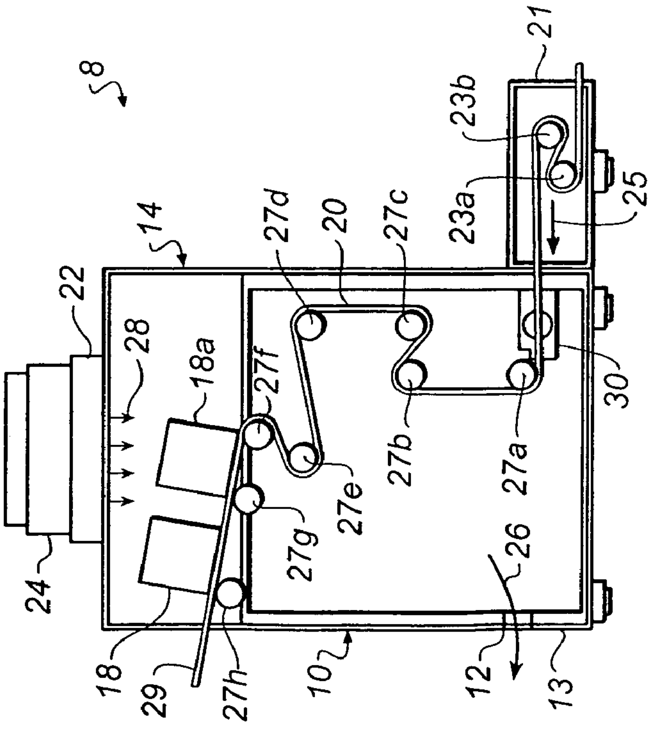
FIG. 3 is a schematic of the continuous web media path with printheads in the enclosure.

FIG. 3 depicts a front view of the enclosure with a continuous web media 20 inside the enclosure. In this embodiment, two ink jet printheads 18 and 18*a* are shown.

One air flow restriction device 12 is shown in a side wall 13 allowing air to exit as shown by the arrow 26. The air moves from inside the enclosure 14 through the air flow restriction device 12 to outside of the enclosure 14. More than one air flow restriction device can be used with the enclosure 14. In a preferred embodiment, all of the air flow restrictions devices are below the printheads.

FIG. 3 shows the load supportable moveable lid 14 resting on the body 10 and is shown in the closed position. In this embodiment, the continuous web media is shown as a holder 21 outside of the load supportable moveable lid 14 for the enclosure. The continuous web media feeds into the enclosure body at a lower portion beneath the ink jet printheads.

The continuous web media 20 can be a paper web, a film web, a coated film web or a similar web print media. In the embodiment, the continuous web media can be utilized at a rate of 1000 feet per minute. Typically, the continuous web media enters the body 10 from a separate source 21 by moving over rollers 23*a* and 23*b* to a continuous web media cleaner 30.

The web cleaner 30 can be installed in the enclosure to clean the continuous web media 20. The web cleaner can be one such as a Web Vac, model Pure Clean 5.0/2 KV Web-Sweep™, available from Argos Environmental Corporation of Miami, Fla.

In this preferred embodiment, the continuous web media direction of movement is indicated by arrow 25. By placing the web cleaner near the point where the continuous web media enters the enclosure, large amounts of paper dust and other debris can be removed from the surface of the continuous web media before the paper dust and other debris can be released from the continuous web media into the enclosure. When used in conjunction with the HEPA filtration means, the particle count levels at critical printhead components are further reduced using this web cleaner.

The rollers, web cleaner, and printheads are all connected or linked by a controller (not shown) that typically has a central processing unit and sensors linked to the processing unit to indicate speed of the web media and temperature of the web media, and thereby regulate the speed of the rollers and the web cleaner relative to these variables.

Once cleaned, the continuous web media typically rolls over, at least one but up to ten more rollers, 27*a*, 27*b*, 27*c*, 27*d*, 27*e*, 27*f*, 27*g*, and 27*h* before passing under the printheads 18 and 18*a* that print on the print media. Lastly, the continuous web media exits the enclosure after printing through an exit 29.

The particulate air filter 22 is placed on the lid within the opening in the lid. The particulate air filter 22 is preferably a high efficiency particulate air filter (HEPA) such as those made by Camfil Farr of Stockholm, Sweden.

A fan 24 is used in conjunction with the HEPA filter to pull the air through the filter and blow the cleaned filtered air 28 into the chamber. Fans usable in this enclosure include those made by EBM—Papst Inc. of Farmington, Connecticut.

The air filter with fan preferably has a flow rate of between 100 and 400 cubic foot per minute. In an alternative embodiment, the filter and fan create a laminar air flow around the ink jet printheads. The result of using the air restriction device with the filter and fan results in a reduced particle contamination from air external to the chamber by a factor between 100 and 1000.

In one embodiment, the air filters have a multi-chambered baffled filter media. The media can be cellulose or an ionic filter or other material, such as a multi-chambered baffled filter media. A preferred filter media is a boro/silicate microfiber glass with an acrylic resin.

The air flow restriction device creates at least 0.05 inches of water pressure differential across the air flow restriction device. In an alternative embodiment, the air flow restriction device can be an electronically controlled aperture air flow restriction device that can connect to the controller mentioned above.

Turning on the fan creates a positive pressure in the enclosure. The positive pressure is useful in an enclosure, such as a clean room in a hospital's AIDS ward where a hospital prefers that particulates and microorganisms do not escape. This positive pressure is controlled by the size and quantity of the at least one air flow restriction devices 12 disposed in the body 10.

This clean air with positive pressure moves around the printheads 18 and 18*a* and through openings around the docking stations that surround each printhead.

The fan, the filter, the rollers of the continuous web media, and the printheads can be linked to a controller, such as a computer processing unit, to make sure all the equipment is working together. Pressure sensors or pressure transducers, and other particulate sensors can be connected to the controller, as well, to help regulate positive air pressure and media flow in the enclosure for an optimum printing condition.

The intent of this device is to provide a filter with fan combination to effectively flood the enclosure with essentially particulate free air or filtered air, reducing particle contamination from air external to the enclosure by a factor of at least 10.

With regard to the size of the enclosure, a preferred enclosure has an overall height of between 2 feet and 20 feet, preferably between 2 feet and 15 feet, and an overall width of between 2 feet and 10 feet, preferably between 2 feet and 7 feet, and an overall length of between 3 and 100 feet, preferably between 3 feet and 40 feet.

Figure 4:
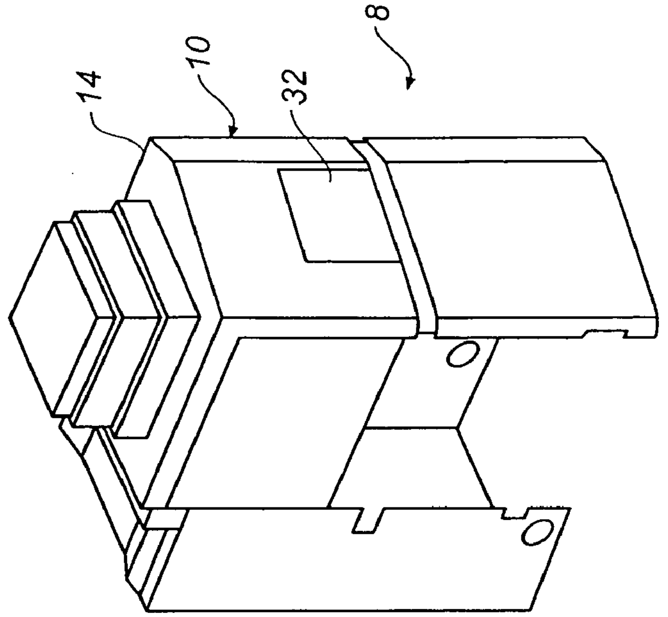
FIG. 4 depicts an embodiment, wherein the enclosure has an access opening or port.

FIG. 4 depicts a perspective view of another embodiment of the enclosure with load supportable moveable lid 14, wherein the enclosure has an access opening 32 in a wall of the body.

The embodiments have been described in detail with particular reference to certain preferred embodiments thereof, but it will be understood that variations and modifications can be effected within the scope of the embodiments, especially to those skilled in the art.

PARTS LIST

8. ink jet printhead enclosure
10. body
11 chamber
12. air flow restriction device
13. side of chamber
14. load supportable lid for a first enclosure
14*a*. load supportable lid for a second enclosure
15 supporting arm
16. opening of first lid
16*a*. opening of second lid
17*a* tilting movement of first lid
17*b* tilting movement of second lid
17*c* shared wall of enclosures
18. first inkjet printhead
18*a*. second ink jet printhead
19 gasket
20. continuous web media
21 separate source of continuous web media
22. high efficiency air filter
23*a* roller
23*b*. roller
24. fan
25 movement of web media
26. air movement
27*a* roller
27*b* roller
27*c*. roller
27*d*. roller
27*e*. roller
27*f*. roller
27*g*. roller
27*h*. roller
28. filtered air
29 exit
30. continuous web media cleaner
32. access opening

What is claimed is:

1. An ink jet printhead enclosure comprising:

a. a body;

b. a load supportable moveable lid having an opening and being disposed on the body;

c. a chamber disposed within the body below the movable lid and having at least one side;

d. continuous web media disposed in the chamber;

e. at least one ink jet printhead located above the continuous web media within the chamber;

f. a high efficiency air filter with a fan disposed in the opening of the moveable lid above the chamber and adapted to bathe the ink jet printhead and the continuous web media in clean filtered air within the chamber, wherein the fan creates a positive air pressure in the chamber by blowing clean filtered air into the chamber; and g. an air flow restriction device disposed in the side below the continuous web media, wherein the air flow restriction device comprises a flow orifice adequate to permit air flow from the chamber while controlling the positive air pressure within the chamber when the fan and filter flood the chamber with clean filtered air, in order to thereby reduce particle contamination in the chamber from air external to the chamber by a factor of at least ten.

2. The ink jet printhead enclosure of claim 1, wherein the moveable lid is hinged.

3. The ink jet printhead enclosure of claim 1, wherein the moveable lid is slidable.

4. The ink jet printhead enclosure of claim 1, wherein the moveable lid is elevated over the body sufficient to remove the ink jet printhead from the body.

5. The ink jet printhead enclosure of claim 1, wherein the moveable lid is in a pivotable engagement with the body.

6. The ink jet printhead enclosure of claim 1, further comprising a gasket continuously disposed around the body between the lid and the body to seal the body.

7. The ink jet printhead enclosure of claim 6, wherein the gasket is an elastomeric material.

8. The ink jet printhead enclosure of claim 1, wherein the particle contamination from air external to the chamber is reduced by a factor between 100 and 1000.

9. The ink jet printhead enclosure of claim 1, wherein the filter creates a laminar air flow around the ink jet printhead.

10. The ink jet printhead enclosure of claim 1, wherein the high efficiency air filter is a member of the group consisting of a. a high efficiency particulate air filter;

b. an ultra low penetration air filter; and c. combinations thereof.

11. The ink jet printhead enclosure of claim 1, wherein particle contamination in the chamber is less than 1000 particles per cubic foot for particles with an average diameter greater than or equal to 0.5 microns.

12. The ink jet printhead enclosure of claim 1, wherein the enclosure comprises an overall height of between 2 feet and about 20 feet, an overall width of between 2 feet and 10 feet, and an overall length of between 3 feet and 100 feet.

13. The ink jet printhead enclosure of claim 12, wherein the enclosure comprises the overall height of between 2 feet and about 15 feet, the overall width of between 2 feet and 7 feet, and the overall length of between 3 feet and 40 feet.

14. The ink jet printhead enclosure of claim 1, wherein at least one wall of the enclosure can act as the wall of another enclosure forming at least a joined dual enclosure.

15. The ink jet printhead enclosure of claim 1, wherein the continuous web media is film, paper, or coated paper.

16. The ink jet printhead enclosure of claim 1, further comprising a continuous web cleaner for cleaning the continuous web media in the enclosure.

17. The ink jet printhead enclosure of claim 1, wherein the load supportable moveable lid further comprises an access opening.

18. The ink jet printhead enclosure of claim 1, wherein the high efficiency air filter with fan provides an air flow rate of between 50 and 2000 cubic feet per minute.

19. The ink jet printhead enclosure of claim 18, wherein the air flow rate is between 100 and 400 cubic feet per minute.

20. The ink jet printhead enclosure of claim 1, wherein the air filter comprises a multi-chambered baffled filter media.

21. The ink jet printhead enclosure of claim 1, wherein the air flow restriction device creates at least 0.05 inches of water pressure differential across the air flow restriction device.

22. The ink jet printhead enclosure of claim 21, wherein the air flow restriction device can include an electronically controlled aperture.

23. An ink jet printhead enclosure comprising:

a. a body;

b. a load supportable moveable lid having an opening and being disposed on the body;

c. a chamber disposed within the body below the movable lid and having at least one side;

d. continuos web media disposed in the chamber;

e. at least one ink jet printhead located above the continuos web media within the chamber;

f. a high efficiency air filter with a fan disposed in the opening of the moveable lid above the chamber and adapted to bathe the ink jet printhead and the continuos web media in clean filtered air, within the chamber wherein the fan creates a positive air presure within the chamber by blowing clean filtered air into the chamber; and g. an air flow restriction device disposed in the side below the continuos web media, wherein the air flow restriction device comprises a flow orifice adequate to permit air flow from the chamber while controlling the positive air presure within the chamber when the fan and filter flood the chamber with the clean filtered air in order to thereby reduce particle contamination in the chamber from air external to the chamber by a factor of at least ten, and wherein the air filter comprises a multi-chambered baffled filter media which is a boro/silicate micro fiber glass with an acrylic resin binder.

* * * * *

UNITED STATES PATENT AND TRADEMARK OFFICE
CERTIFICATE OF CORRECTION

PATENT NO. : 7,207,671 B2
APPLICATION NO. : 10/839406
DATED : April 24, 2007
INVENTOR(S) : Brian G. Morris et al.

It is certified that error appears in the above-identified patent and that said Letters Patent is hereby corrected as shown below:

| | |
|---|---|
| Column 6, Line 13 | In Claim 1, delete “filter” and insert -- filter, --. |
| Column 7, Line 19 | In Claim 23, delete “continuos” and insert -- continuous --. |
| Column 7, Line 20-21 | In Claim 23, delete “continuos” and insert -- continuous --. |
| Column 8, Line 3 | In Claim 23, delete “continuos” and insert -- continuous --. |
| Column 8, Line 4 | In Claim 23, delete “air,” and insert -- air --. |
| Column 8, Line 4 | In Claim 23, delete “chamber” and insert -- chamber, --. |
| Column 8, Line 5 | In Claim 23, delete “presure” and insert -- pressure --. |
| Column 8, Line 9 | In Claim 23, delete “continuos” and insert -- continuous --. |
| Column 8, Line 12 | In Claim 23, delete “presure” and insert -- pressure --. |

Signed and Sealed this

Sixth Day of May, 2008

JON W. DUDAS
*Director of the United States Patent and Trademark Office*